United States Patent
Huang et al.

(10) Patent No.: US 6,941,565 B2
(45) Date of Patent: Sep. 6, 2005

(54) DISK CARRIER MECHANISM WITH WEDGED MEMBER SET

(75) Inventors: Chen-Yuan Huang, Taipei (TW); Chi-Shen Chang, Hsinchu (TW)

(73) Assignee: Industrial Technology Research Institute, Hsinchu Hsien (TW)

( * ) Notice: Subject to any disclaimer, the term of this patent is extended or adjusted under 35 U.S.C. 154(b) by 241 days.

(21) Appl. No.: 10/356,592

(22) Filed: Feb. 3, 2003

(65) Prior Publication Data

US 2004/0071070 A1 Apr. 15, 2004

(30) Foreign Application Priority Data

Oct. 11, 2002 (TW) .......................................... 91123416 A

(51) Int. Cl.[7] .............................................. G11B 17/04
(52) U.S. Cl. ...................................................... 720/623
(58) Field of Search ............................... 720/623, 622, 720/620, 619, 617, 600; 369/77.1, 77.11

(56) References Cited

U.S. PATENT DOCUMENTS

| | | | |
|---|---|---|---|
| 4,527,264 A | * | 7/1985 | d'Alayer de Costemore d'Arc ............................. 720/619 |
| 6,028,831 A | * | 2/2000 | Scholz et al. ................ 720/621 |
| 6,219,324 B1 | | 4/2001 | Sato et al. ................... 720/623 |
| 2004/0027933 A1 | * | 2/2004 | Togashi et al. ........... 369/30.77 |

* cited by examiner

Primary Examiner—Julie Anne Watko
(74) Attorney, Agent, or Firm—Birch, Stewart, Kolasch & Birch, LLP

(57) ABSTRACT

A disk carrier mechanism is used for moving a disk between an insertion position and a reading position. The disk carrier mechanism includes a wedged member set, a fixing board, a sliding board, and a driver set. The wedged member set includes multiple wedged members, each with a wedged part for wedging a disk. The driver set is formed on the fixing board for driving the sliding board to move relative to the fixing board. After being inserted, a disk is wedged in the wedged part and the force of inserting the disk pushes the sliding board to move to the position where the sliding board makes contact with the driver set. Thus the driver set drives the sliding board to place the disk in the reading position. Thus fewer members are used to accomplish the goal of moving the disk, which simplifies the actions of members, the fabrication of the mechanism, and reduces cost.

13 Claims, 9 Drawing Sheets

DISK CARRIER MECHANISM WITH WEDGED MEMBER SET

FIELD OF THE INVENTION

The invention relates to a disk carrier mechanism adopted for use in retracting optical disk drives, and particularly a disk carrier mechanism that operates with simplified element movements.

BACKGROUND OF THE INVENTION

Among the peripheral devices of personal computers, the optical disk drive has become an indispensable piece of equipment. With the growing popularity of multimedia information in recent years, a great amount of data and products are stored on optical disks. Optical disks also have many advantages over other data media, thus the demand and popularity of optical disk drives such as CD and DVD is constantly increasing.

In order to facilitate disk insertion and retrieval in the small space of the optical disk drive, a retracting optical disk drive has been developed, such as the one disclosed in U.S. Patent No. 6,219,324. Conventional retracting optical disk drives mostly employ a guiding board to direct and position the disk. The guiding board has a plurality of slots to couple with elements such as cams and latch hooks. The cited patent has many elements. Thus production cost is higher, the fabrication process is complicated, and accurate positioning and assembly are difficult.

In view of the aforesaid disadvantages, to design a disk carrier mechanism with fewer elements and simplified movements to make assembly simpler, positioning easier, fabrication procedures simpler, and production cost lower has become a key focus in the development of the retracting optical disk drive.

SUMMARY OF THE INVENTION

The primary object of the invention is to provide a disk carrier mechanism that can carrying a disk with fewer elements and simplified element movements, and make assembly easier and cost lower.

The disk carrier mechanism for optical disk drives of the invention is used to carry the disk between an inserted position and a reading position. The inserted position is the position on the disk carrier mechanism of the optical disk drive where the disk is placed. The reading position is the position of the chuck of the optical disk drive where the opening of the disk is located.

The invention consists of a wedged member set, a fixing board, a sliding board and a driver set. The wedged member set couples with guiding slots of the fixing board and fixing holes of the sliding board to enable the sliding board and wedged member set to slidably mount onto the fixing board. The wedged member set includes a plurality of wedged members, each with a wedged part to wedge the disk. The driver set is mounted onto the fixing board to drive the sliding board to slide relative to the fixing board.

When the disk is placed on the disk carrier mechanism, the disk is wedged in the wedged part to push the wedged member set to move along the guiding slots of the fixing board, and move the sliding board relative to the fixing board to the corresponding driver set. The driver set drives the sliding board and the wedged member set moves the disk to the reading position. In contrast, when retracting the disk, the driver set drives the sliding board, and the wedged member set moves along the guiding slots to move the disk on the wedged part of the wedged member set. When the sliding board separates from the driver set, the disk is moved to the inserted position by the wedged member set.

The foregoing, as well as additional objects, features and advantages of the invention will be more readily apparent from the following detailed description, which proceeds with reference to the accompanying drawings.

DESCRIPTION OF THE PREFERRED EMBODIMENT

Figure 2:
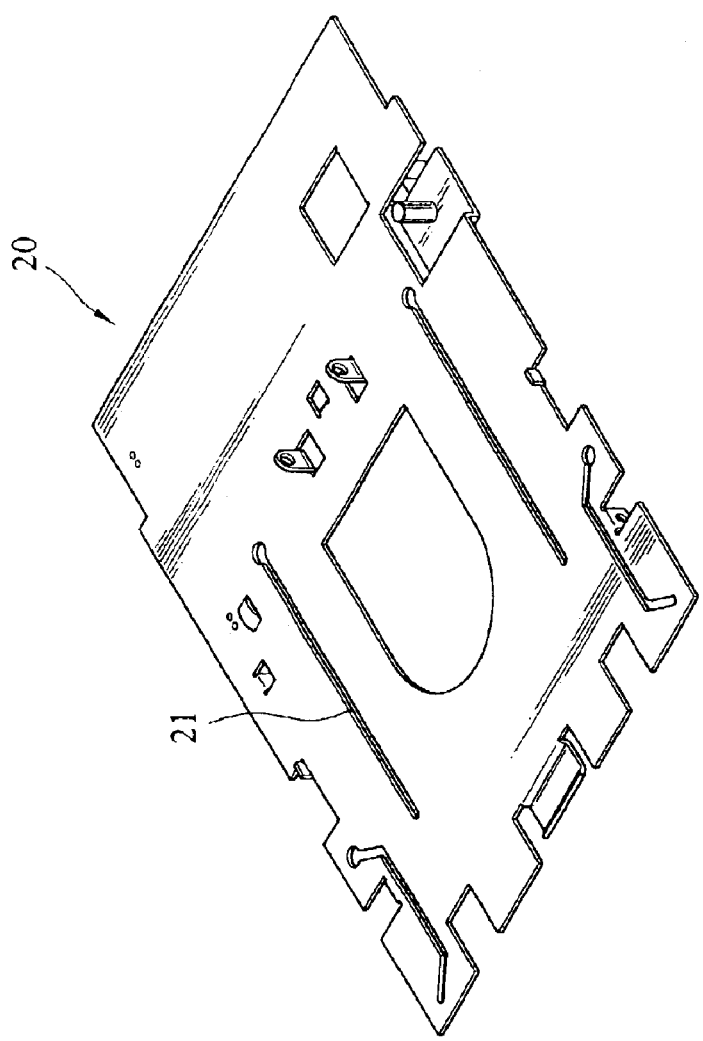
FIG. 2 is a perspective view of the fixing board of the invention.
Figure 1:
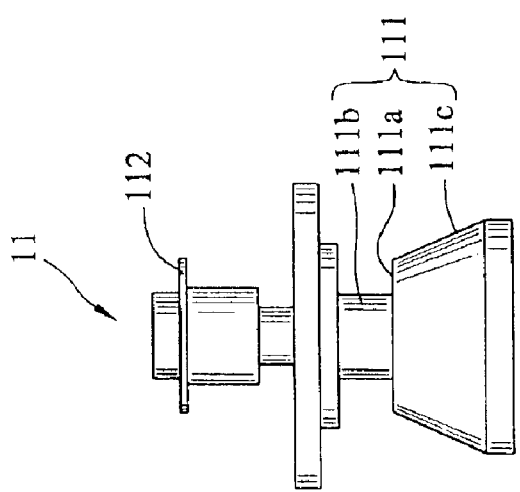
FIG. 1 is a sectional view of the wedged member of the invention.
Figure 4:
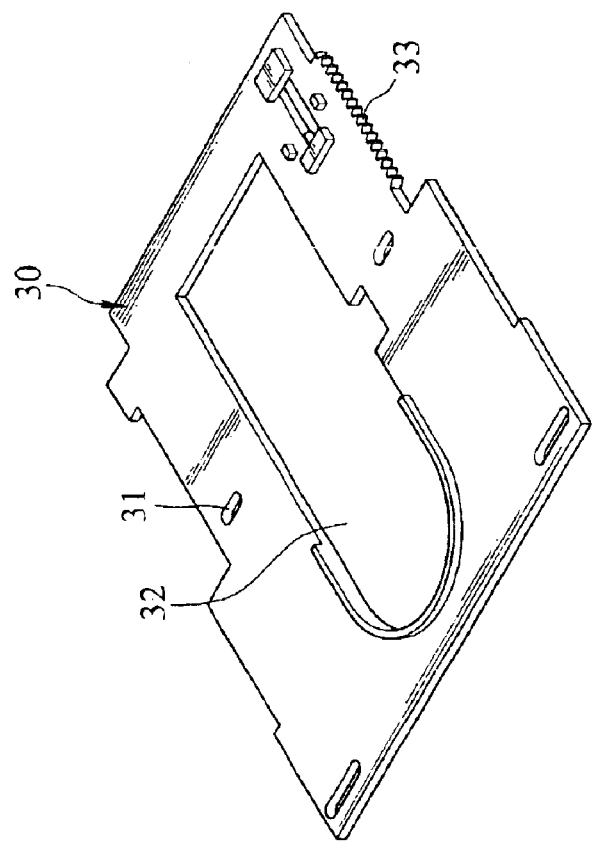
FIG. 4 is a perspective view of the sliding board of the invention.
Figure 3:
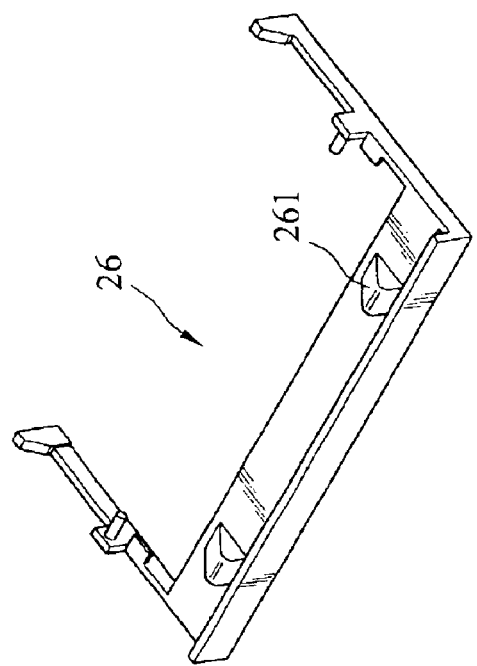
FIG. 3 is a perspective view of the guiding board of the invention.
Figure 5:
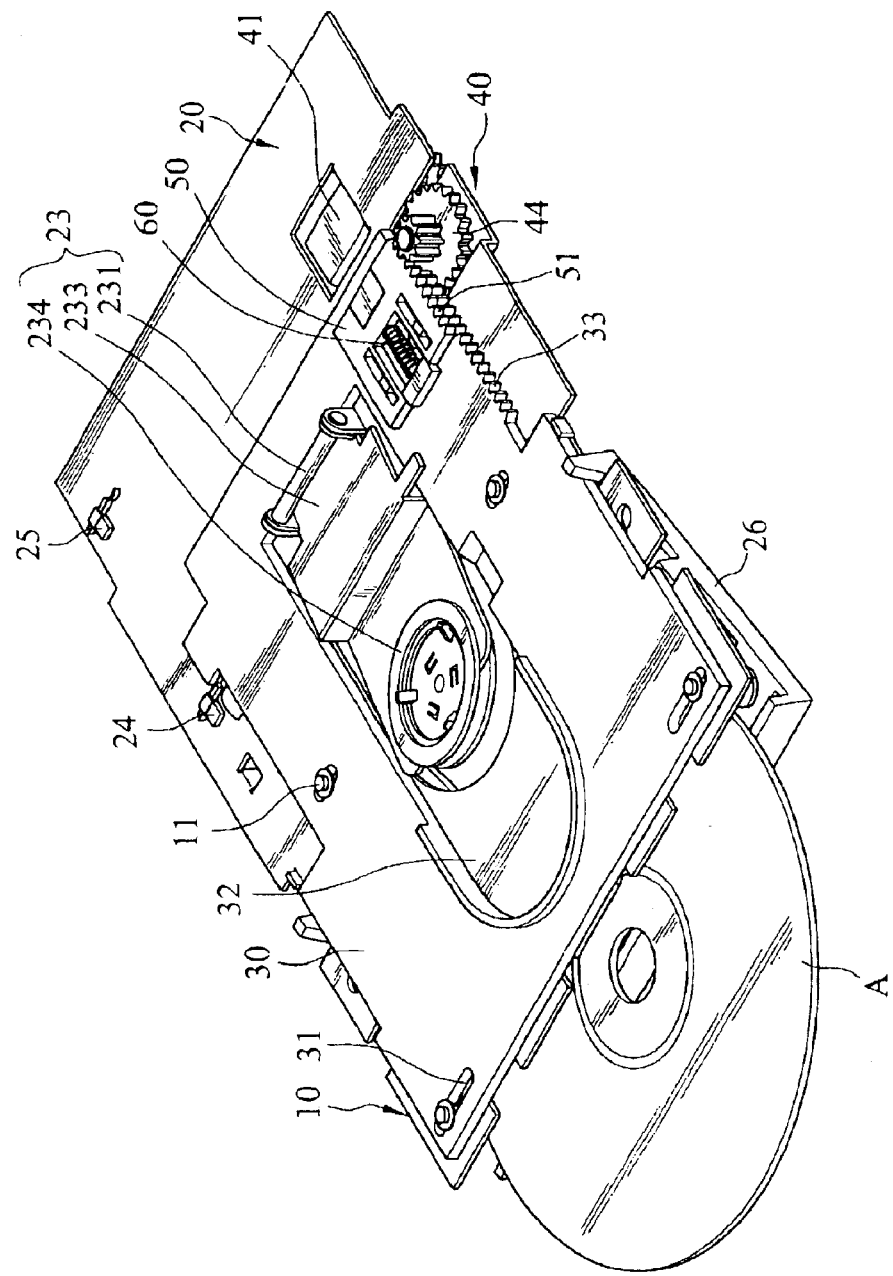
FIG. 5 is a front perspective view of the invention.
Figure 6:
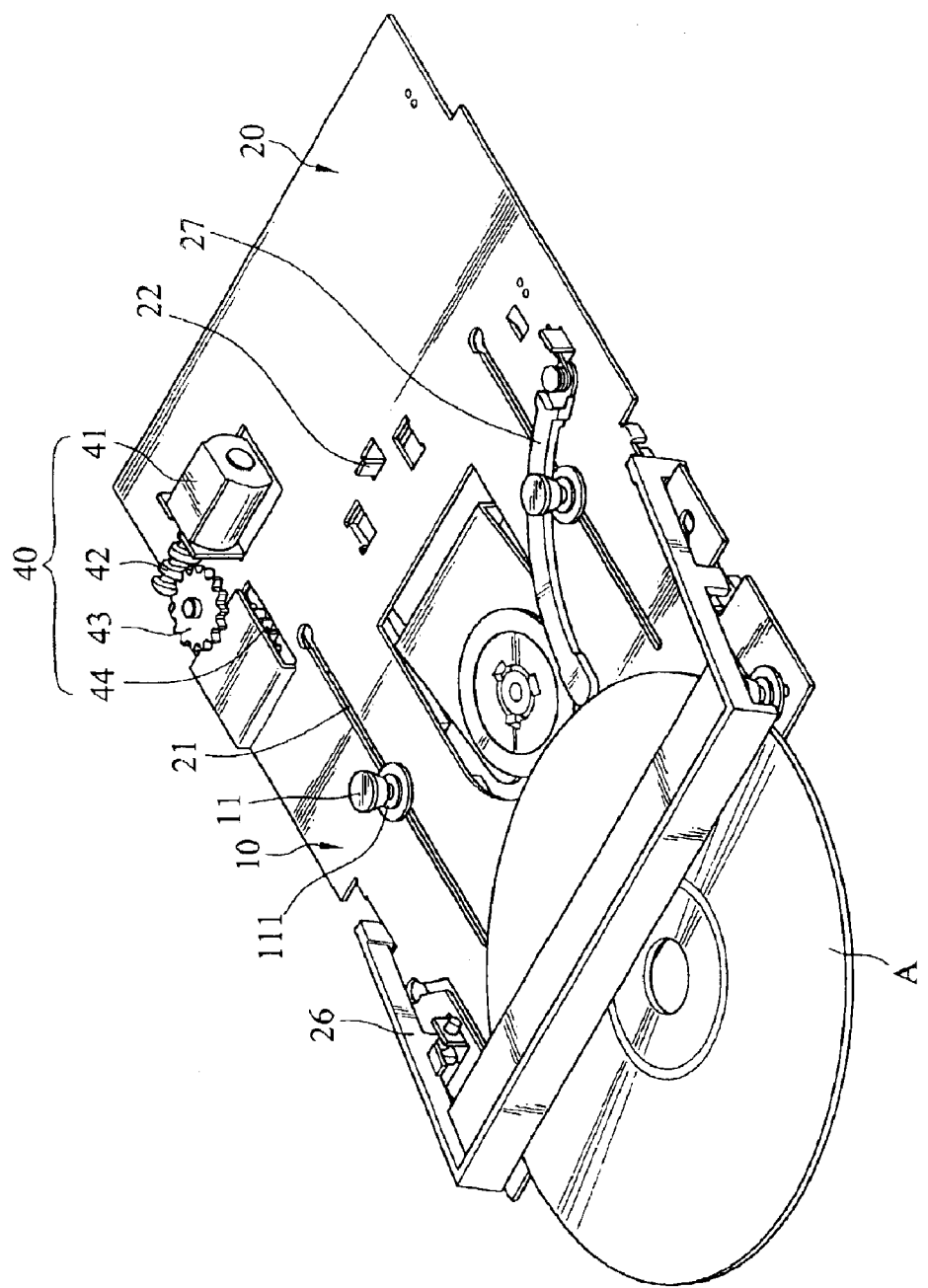
FIG. 6 is a back perspective view of the invention.
Figure 7A:
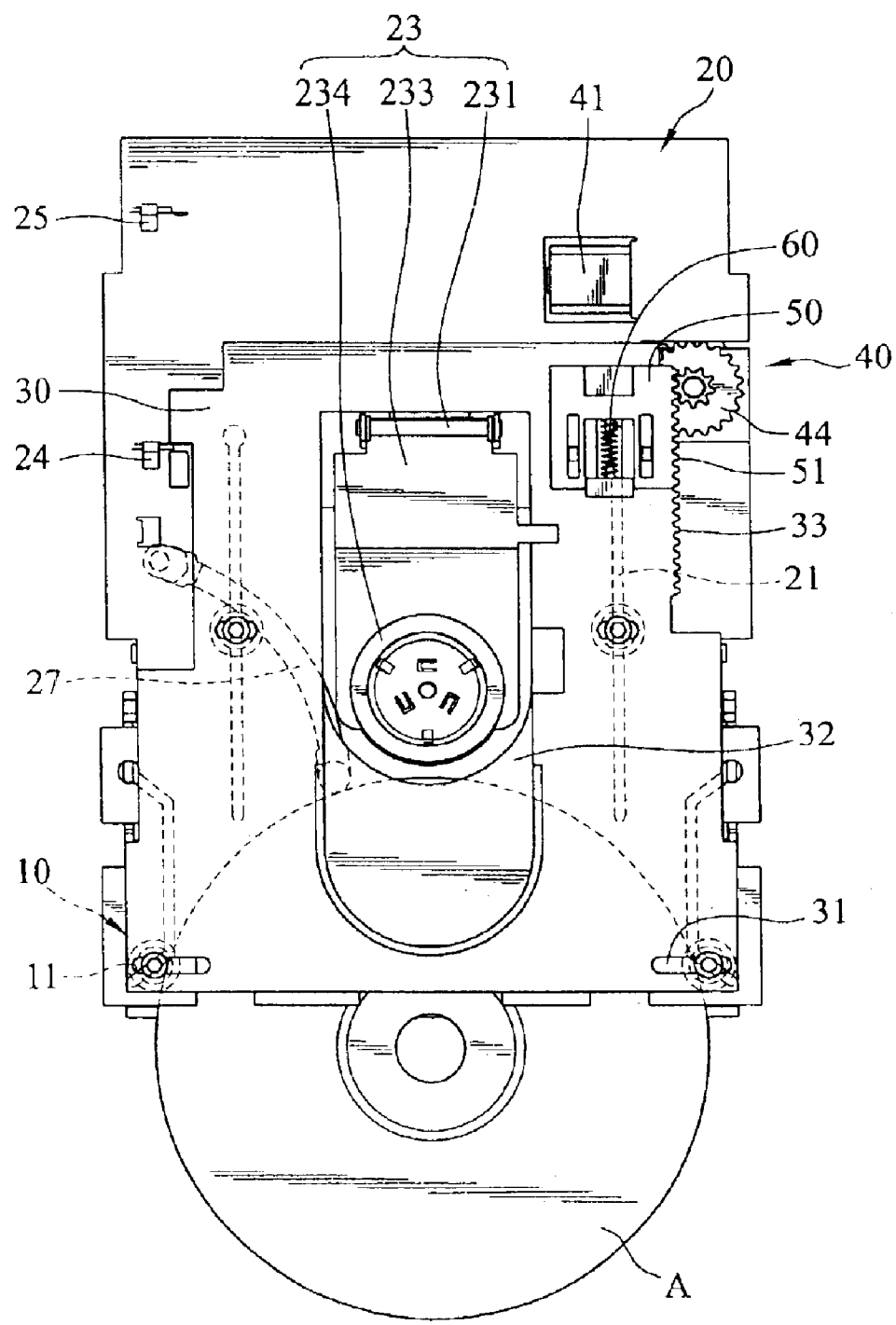
FIGS. 7A through 7E are schematic views of the invention, showing the disk in various moving conditions.
Figure 7B:
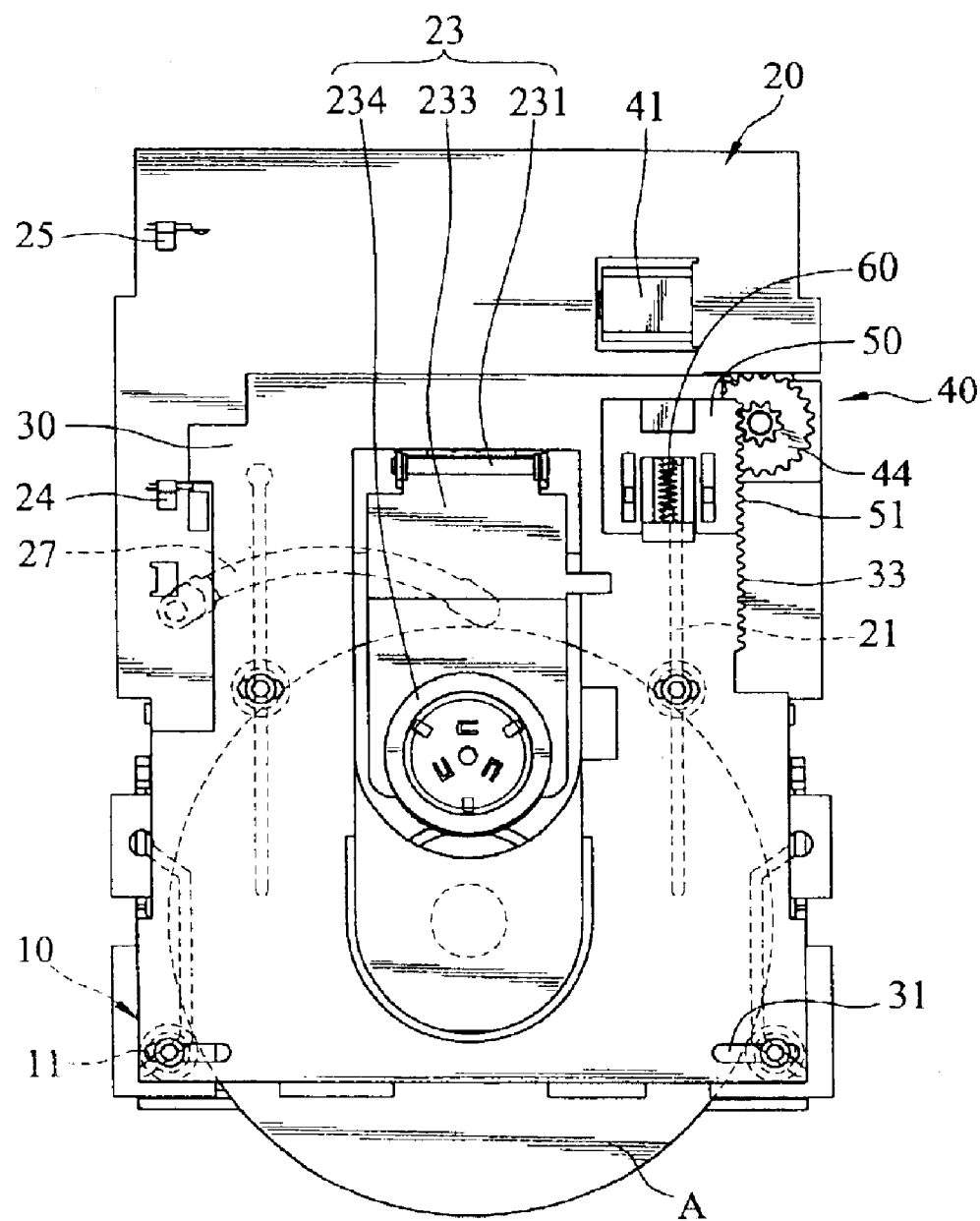
Figure 7C:
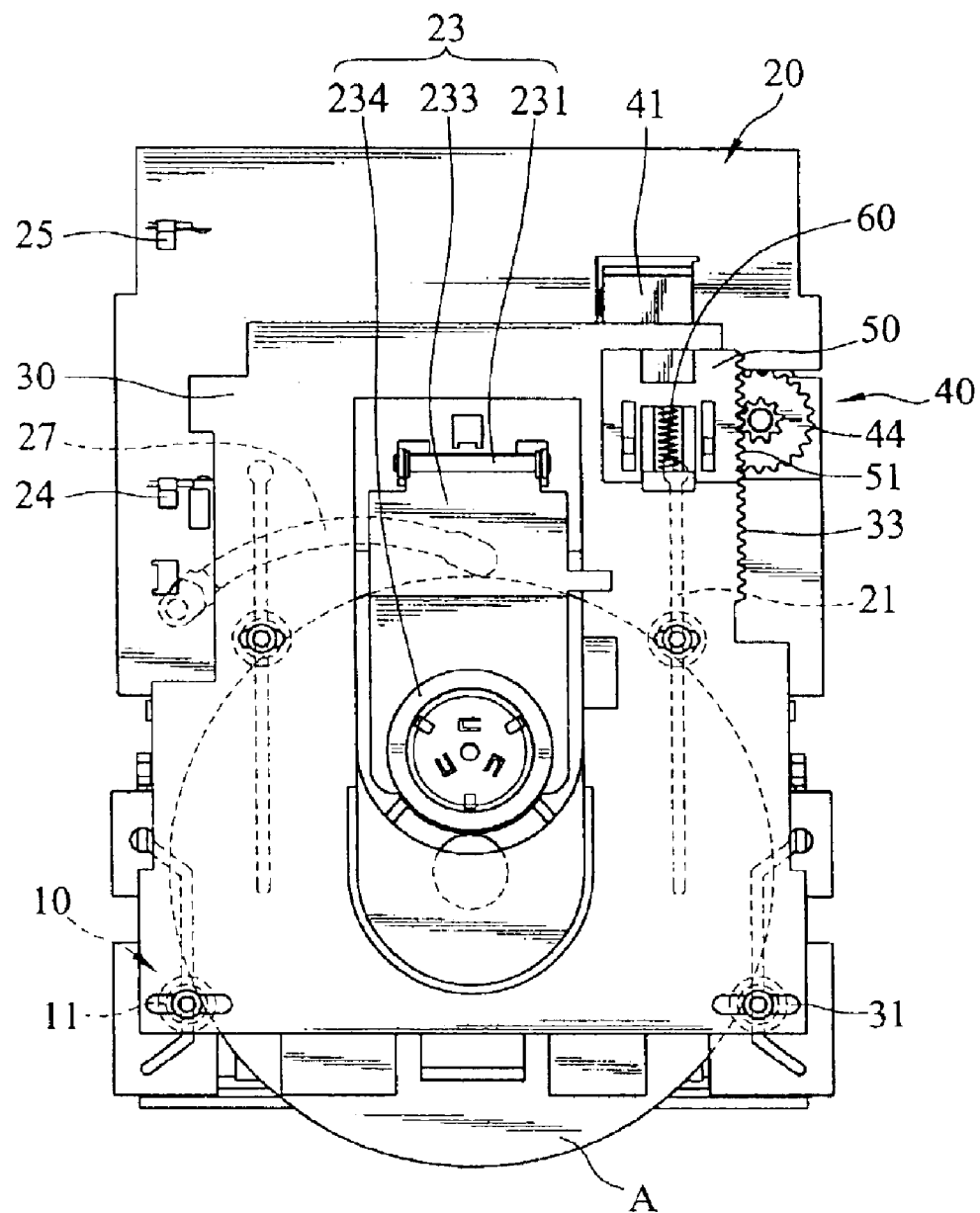
Figure 7D:
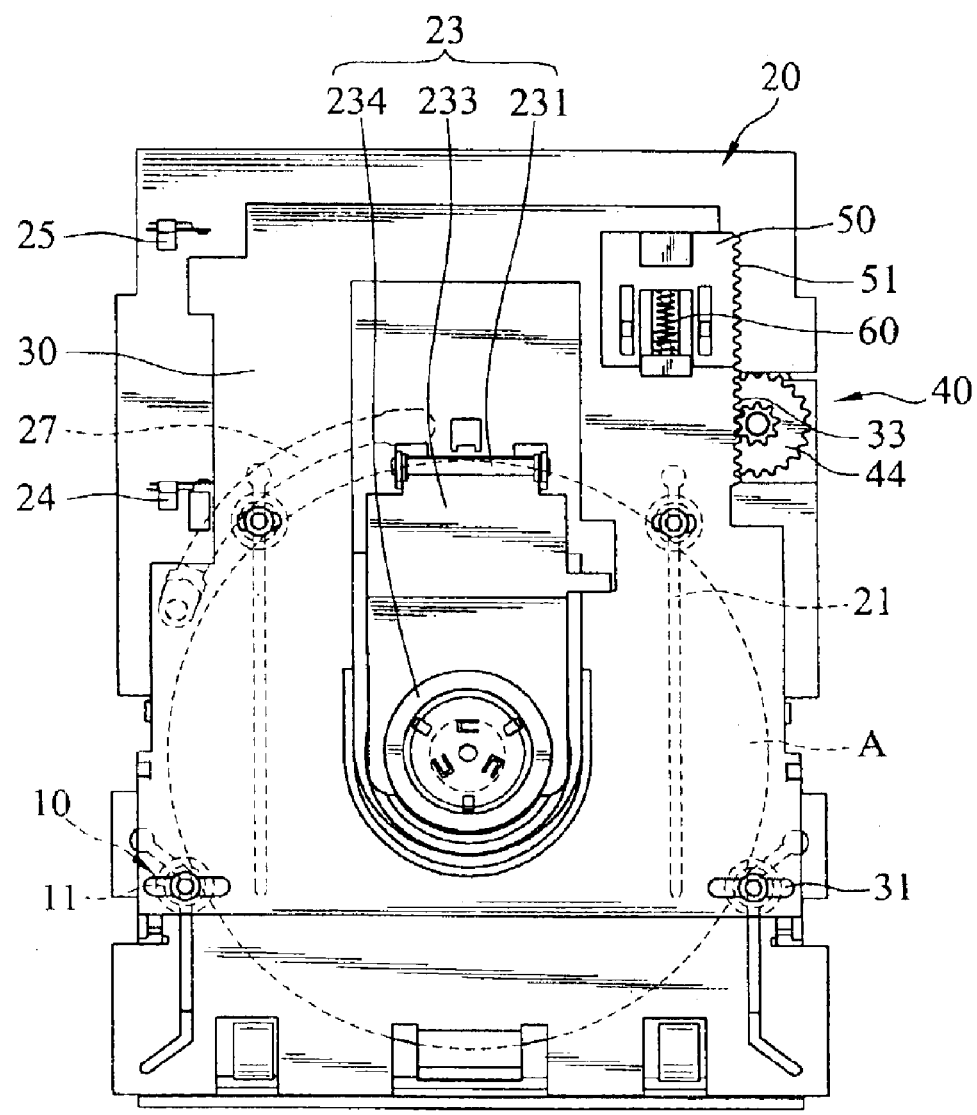
Figure 7E:
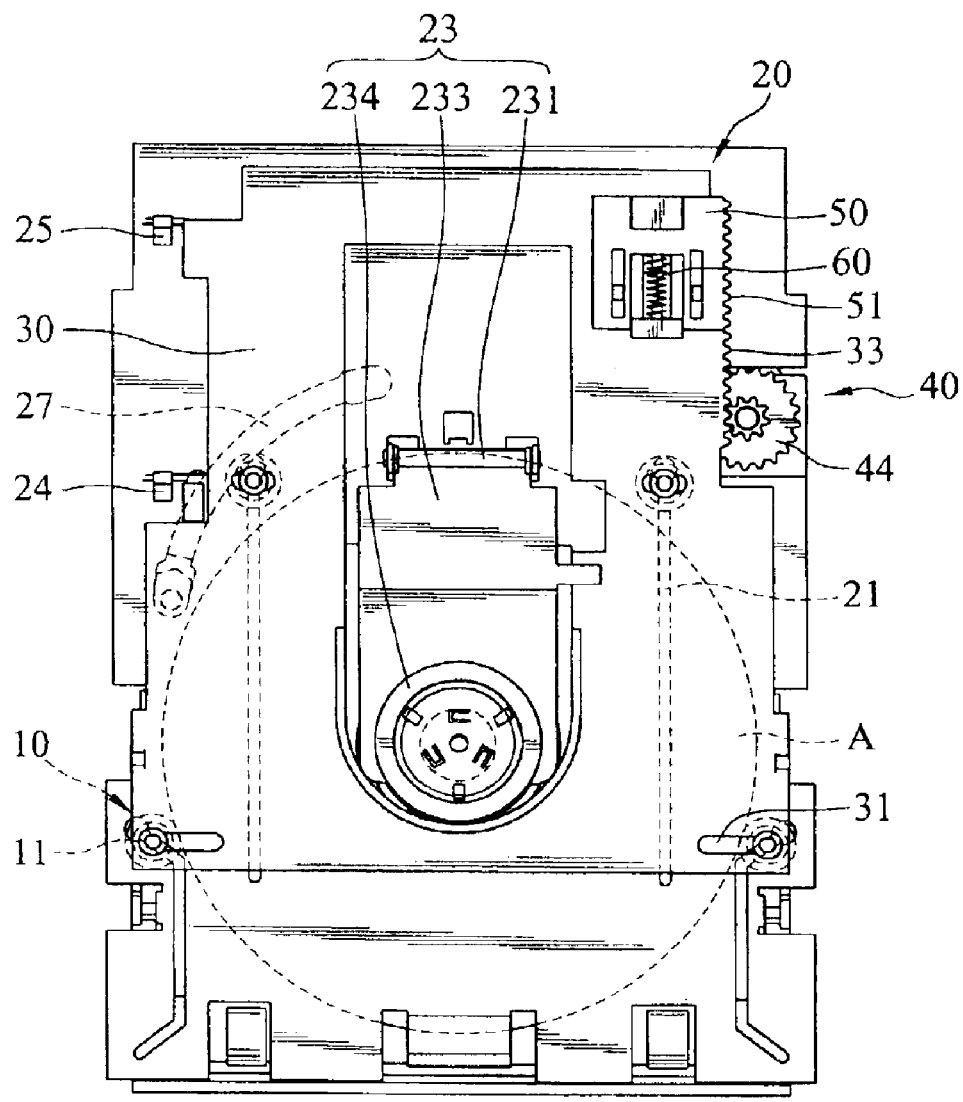

Referring to FIGS. 1 through 6, the disk carrier mechanism of the invention aims at carrying a disk A between an inserted position and a reading position. The inserted position is the location where the disk A is placed on the disk carrier mechanism of the optical disk drive. The reading position is the location of the chuck of the optical disk drive where the opening of the disk is mounted (also referring to FIGS. 7A and 7E).

The disk carrier mechanism of the invention includes a wedged member set 10, a fixing board 20, a sliding board 30, a driver set 40, a sliding member 50 and an elastic element 60. The wedged member set 10 enables the sliding board 30 to movably couple on one side of the fixing board 20 and moves the disk A. The driver set 40 drives the sliding board 30 to move relative to the fixing board 20. The sliding member 50 is connected to the sliding board 30 by the elastic element 60.

The wedged member set 10 includes a plurality of wedged members 11. Each wedged member 11 has a wedged part 111 and a washer 112. The wedged part 111 may wedge the disk A. It includes a plane 111a, a side wall 111b and a sloped surface 111c. The plane 111a may hold the disk A horizontally. The side wall 111b connects to the plane 111a to allow the wedged member 11 to be pushed by the disk A and drives the disk A when the wedged member 11 is moved. The plane 111a and the side wall 111b may wedge the disk A. The sloped surface 111c connects to the plane 111a to guide the disk A to wedge in the wedged member 11 and escape from the wedged member 11. The washer 112 is movably mounted onto the wedged member 11 to keep the sliding board 30 movably located on one side of the fixing board 20.

The fixing board 20 has a plurality of guiding slots 21, a retaining section 22, a clamp set 23, a front switch 24, a rear switch 25, a guiding board 26 and a lever 27. Each guiding slot 21 couples with one wedged member 11 and guides the movement of the wedged member 11. The retaining section 22 is located on one side of the fixing board 20 (opposite to the side of the fixing board 20 where the sliding board 30 is located) to enable the disk A to separate from the wedged member 11. The clamp set 23, front switch 24 and rear switch 25 are located on another side of the fixing board 20 (the side of the fixing board 20 where the sliding board 30 is located). The clamp set 23 includes a clamping rod 231, a clamping spring (not shown in the drawings), a clamping plate 233 and a clamping member 234. The clamping rod 231 is pivotally mounted on the fixing board 20. The clamping spring (not shown in the drawings) is coupled with the clamping rod 231. The clamping plate 233 is coupled with the clamping rod 231 in a turnable manner. The clamping member 234 is fixedly mounted onto the clamping plate 233 and is located in a position corresponding to the reading position of the disk A so that when the disk A is moved with its opening corresponding to the chuck of the optical disk drive, the clamp set 23 presses the disk A to the chuck on the reading position. The front switch 24 and the rear switch 25 connect electrically with the driver set 40, and correspond respectively to the starting point and the finishing point of the movement displacement of the sliding board 30 relative to the fixing board 20 to actuate the driver set 40. The guiding board 26 is located on one side of the fixing board 20 (opposite to the side of the fixing board 20 where the sliding board 30 is located) and has a guiding surface 261 to direct the disk A to the inserted position and make the disk A wedge in the wedged part 111. The lever 27 is pivotally located on one side of the fixing board 20 (opposite to the side of the fixing board 20 where the sliding board 30 is located).

The sliding board 30 has a plurality of fixing holes 31 corresponding to the guiding slots 21 and an opening 32 corresponding to the clamp set 23. It also has a first gear rack 33. The dimensions of the fixing hole 31 correspond to the wedged member 11 so that the wedged member 11 may couple with the corresponding fixing hole 31 and the guiding slot 21. When the wedge part 111 is located on one side of the fixing board 20, the sliding board 30 is slidably located on another side of the fixing board 20. When the sliding board 30 is moved, the clamp set 23 is located in the opening 32 without affecting the movement of the sliding board 30. The first gear rack 33 is located on one side of the sliding board 30 adjacent to the driver set 40 to be driven by the driver set 40.

The driver set 40 is mounted onto the fixing board 20. It includes a motor 41, a worm 42, a first gear 43 and a second gear 44. The motor 41 is located on one side of the fixing board 20 where the wedged part 111 is located. The worm 42 is coupled with the motor 41 and is located on one side of the fixing board 20 where the wedged part 111 is located. The first gear 43 engages with the worm 42 and is located on one side of the fixing board 20 where the wedged part 111 is located. The second gear 44 engages with the first gear 43 and is located on another side of the fixing board 20 opposite to where the wedged part 111 is located (but on the side of the fixing board 20 where the sliding board 30 is located). When the motor 41 rotates it drives the worm 42, which in turn drives the first gear 43 and the second gear 44 to rotate.

The sliding member 50 is located on one side of the sliding board 30 adjacent to the driver set 40, and is movable relative to the sliding board 30. It has a second gear rack 51 formed on one side adjacent to and driven by the driver set 40. The elastic element 60 couples with the sliding member 50 and the sliding board 30 such that when the wedged member set 10 moves along the guiding slots 21, the sliding board 30 is driven and moved relative to the fixing board 20, and the driver set 40 drives the sliding member 50 (through the second gear rack 51) to move. The elastic element 60 drives the sliding board 30 to move, the driver set 40 drives the sliding board 30 (through the first gear rack 33), and the disk A is moved to the reading position. On the other hand, when the sliding board 30 separates from the driver set 40, the sliding member 50 and the elastic element 60 push the sliding board 30 outwards, and the disk A is moved to the inserted position.

Referring to FIGS. 7A through 7E, when the invention is in use and the disk A is inserted, the guiding surface 261 of the guiding plate 26 guides the disk A to the inserted position and pushes the lever 27. The disk A is then wedged in the wedged part 111 of the wedged member 11 of the wedged member set 10. The wedged member 11 is pushed by the external force applied to the disk A and is moved along the guiding slot 21. It moves the sliding board 30 at the same time relative to the fixing board 20. When the sliding member 50 is moved to the second gear rack 44 of the driver set 40, the sliding board 30 is moved away from the front switch 24, and the motor 41 is actuated to rotate. The worm 42 is then driven, and the first gear 43 and second gear 44 are driven to rotate. Through the second gear rack 51, the sliding member 50 is driven by the second gear 44, and the elastic element 60 drives the sliding board 30 to move. The second gear 44 drives the sliding board 30 through the first gear rack 33. When the wedged member set 10 moves the disk A to couple its opening with the chuck of the optical disk drive, the sliding board 30 is driven continuously by the second gear 44, so the sliding board 30 is moved continuously until reaching the rear switch 25. Meanwhile, the lever 27 turns continuously because of the movement of the wedged member 11. The disk A is stopped by the retaining section 22, drops downwards from the plane 111a and side wall 111b of the wedged part 111 along the sloped surface 111c, and escapes from the wedging of the wedged member 11. Meanwhile, the clamping plate 233 of the clamp set 23 turns about the clamping rod 231 to press the disk A to the chuck through the clamping member 234 to keep the disk A in the reading position.

In contrast, when retracting the disk A, the motor 41 of the driver set 40 drives the sliding board 30 to move, the disk A is moved upwards along the sloped surface 111c to the plane 111a and the side wall 111b, and is wedged in the wedged part 111. Meanwhile, the clamp plate 233 raises the clamping member 234 to facilitate wedging of the disk A in the wedged part 111 of the wedged member 11. As previously discussed, when the sliding board 30 is moved, the disk A is also moved with the wedged member set 11 until the first gear rack 33 of the sliding board 30 is separated from the second gear 44 of the driver set 40. The elastic element 60 pushes the sliding board 30, which presses the front switch 24, and the driver set 40 stops operating. Meanwhile, the lever 27 moves the disk A outwards to complete the retracting movements for the disk A.

In summary, the disk carrier mechanism of the invention has fewer elements, and is thus easier to assemble. Element movements for loading the disk also are simplified. Thus cost may be reduced and positioning of the elements is more accurate.

While the preferred embodiment of the invention has been set forth for the purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. A disk carrier mechanism for carrying a disk between an inserted position and a reading position, the inserted position being located on the disk carrier mechanism for holding the disk and the reading position being the position of a chuck of an optical disk drive for coupling with the opening of the disk, the disk carrier mechanism comprising:

a wedged member set including a plurality of wedged members each having a wedged part;

a fixing board having a plurality of guiding slots;

a sliding board having a plurality of fixing holes corresponding to the guiding slots, the dimensions of the fixing holes corresponding to the wedged member such that the wedged member being coupled with the fixing hole and the guiding slot, the sliding board being slidably mounted onto another side of the fixing board when the wedged part is located on one side of the fixing board; and a driver set mounted onto the fixing board such that when the disk is mounted and wedged in the wedged part, the disk pushes the wedged member set to move along the guiding slots to drive the sliding board to move relative to the fixing board until reaching the driver set and the driver set drives the sliding board to move the disk through the wedged member set to the reading position; when the disk is retracted the driver set drives the sliding board and the wedged member set moves along the guiding slots to wedge the disk in the wedged part of the wedged member set, and the disk is moved to the inserted position by the wedged member set when the sliding board is separated from the driver set.

2. The disk carrier mechanism of claim 1 further including:

a sliding member located on one side of the sliding board adjacent to the driver set and being movable relative to the sliding board; and an elastic element coupling with the sliding member and the sliding board such that when the wedged member set moves along the guiding slots the sliding board is driven and moved together relative to the fixing board, and the driver set drives the sliding member moving, and the elastic element drives the sliding board moving, and the driver set drives the sliding board to move the disk to the reading position; when the sliding board is separated from the driver set, the sliding member and the elastic element push the sliding board outwards to allow the disk be wedged in the wedged member set and be moved to the inserted position.

3. The disk carrier mechanism of claim 2, wherein the sliding member further includes a second gear rack located on one side thereof adjacent to the driver set to be driven by the driver set.

4. The disk carrier mechanism of claim 1, wherein each wedged member further includes a washer movably coupling with the wedged member for fastening the wedged member in the guiding slot and the fixing hole.

5. The disk carrier mechanism of claim 1, wherein the wedged part of the wedged member includes a plane, a side wall and a sloped surface, the plane for holding the disk horizontally, the side wall connecting to the plane to allow the wedged member be moved by the disk and drive the disk when the wedged member is moved, the plane and the side wall wedging the disk, and the sloped surface connecting to the plane to guide the disk be wedged in the wedged member and be separated from the wedged members.

6. The disk carrier mechanism of claim 1, wherein the fixing board has a retaining section located on one side of the fixing board where the wedged part is located to separate the disk from the wedged members.

7. The disk carrier mechanism of claim 1, wherein the fixing board further has a clamp set, the sliding board having an opening corresponding to the clamp set such that the clamp set is located in the opening when the sliding board is moved, the clamp set including:

a clamping rod mounted onto the fixing board;

a clamping spring coupling with the clamping rod;

a clamping plate coupling with the clamping rod in a turnable manner; and a clamping member mounted onto the clamping plate corresponding to the reading position of the disk such that when the disk is moved by the sliding board with the opening of the disk corresponding to the chuck of the optical disk drive the clamp set presses the disk to the chuck on the reading position.

8. The disk carrier mechanism of claim 1, wherein the fixing board further has a front switch and a rear switch connecting electrically with the driver set, and corresponding respectively to a starting point and a finishing point of the movement displacement of the sliding board relative to the fixing board to actuate the driver set.

9. The disk carrier mechanism of claim 1, wherein the fixing board further has a guiding board located on one side thereof where the wedged part is located to guide the disk to the inserted position.

10. The disk carrier mechanism of claim 9, wherein the guiding board has a guiding surface for guiding the disk to the inserted position and wedge the disk in the wedged part.

11. The disk carrier mechanism of claim 1, wherein the fixing board further includes a lever pivotally mounted on one side thereof where the wedged part is located.

12. The disk carrier mechanism of claim 1, wherein the sliding board further has a first gear rack located on one side thereof adjacent to the driver set and to be driven by the driven set.

13. The disk carrier mechanism of claim 1, wherein the driver set includes:

a motor located on one side of the fixing board where the wedged part is located;

a worm coupled with the motor and located on one side of the fixing board where the wedged part is located;

a first gear engaging with the worm and being located on one side of the fixing board where the wedged part is located; and a second gear engaging with the first gear and being located on another side of the fixing board opposite to where the wedged part is located such that the motor drives the worm which drives the first gear and the second gear to rotate.

* * * * *